(12) United States Patent
Wang et al.

(10) Patent No.: US 8,761,679 B2
(45) Date of Patent: Jun. 24, 2014

(54) INTERFERENCE AVOIDANCE

(75) Inventors: Yue Wang, Bristol (GB); Justin Coon, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1052 days.

(21) Appl. No.: 12/235,006

(22) Filed: Sep. 22, 2008

(65) Prior Publication Data

US 2009/0088092 A1 Apr. 2, 2009

(30) Foreign Application Priority Data

Sep. 27, 2007 (GB) .................................. 0718866.7

(51) Int. Cl.
*H04B 1/00* (2006.01)
*H04J 11/00* (2006.01)
*H04L 25/03* (2006.01)
*H04B 1/71* (2011.01)

(52) U.S. Cl.
CPC ...... *H04B 1/71* (2013.01); *H04B 2201/709709* (2013.01); *H04J 11/0066* (2013.01); *H04L 25/03828* (2013.01)
USPC ....... 455/63.1; 455/63.4; 455/114.2; 375/260

(58) Field of Classification Search
CPC ................................................ H04L 25/03828
USPC ...................... 455/63.1, 114.2, 63.4; 375/260
See application file for complete search history.

(56) References Cited

U.S. PATENT DOCUMENTS

| 5,257,283 A * | 10/1993 | Gilhousen et al. ............. 455/522 |
| 2005/0085197 A1 * | 4/2005 | Laroia et al. .................. 455/101 |
| 2006/0008016 A1 | 1/2006 | Balakrishnan et al. |
| 2007/0076813 A1 | 4/2007 | Haartsen |
| 2007/0195898 A1 * | 8/2007 | Yamaguchi .................... 375/260 |
| 2007/0254592 A1 * | 11/2007 | McCallister et al. ....... 455/67.11 |
| 2008/0075033 A1 * | 3/2008 | Shattil .......................... 370/328 |
| 2010/0158174 A1 | 6/2010 | Haartsen |
| 2010/0184391 A1 | 7/2010 | Razzell |

FOREIGN PATENT DOCUMENTS

| WO | WO2006/007599 | 1/2006 |
| WO | WO 2007/039557 A1 | 4/2007 |
| WO | WO 2007/063528 A2 | 6/2007 |

OTHER PUBLICATIONS

Justin P. Coon "Optimization of Single-Carrier UWB Transmissions for Narrowband Interference Avoidance", IEEE Communications Society, 2007, pp. 1617-1621).
Extended European Search Report issued Jan. 7, 2013 in Patent Application No. 08253036.1.
Office Action issued Dec. 14, 2010 in Japanese Application No. 2008-249450 (w/English translation).
Yue Wang et al., "Active Interference Cancellation for Systems with Antenna Selection," Proceedings of the IEEE International Conference on Communications, 2008, ICC' 08, May 23, 2008, pp. 3785-3789.

* cited by examiner

*Primary Examiner* — Hsin-Chun Liao
(74) *Attorney, Agent, or Firm* — Oblon, Spivak, McClelland, Maier & Neustadt, L.L.P.

(57) ABSTRACT

A method of shaping signals intended for transmission via at least one antenna, each signal having a respective frequency spectrum and being for transmission via a respective antenna, comprises selecting at least one interference-reducing signal, each interference-reducing signal being such as to modify the signal frequency spectrum for the antenna or a respective one of the antennas to include a respective frequency notch at an interference band, and modifying the frequency spectra with the selected interference-reducing signal or signals, wherein the selection is subject to a constraint on at least one characteristic of the spectra as modified

14 Claims, 12 Drawing Sheets

INTERFERENCE AVOIDANCE

The present invention relates to a method of, and apparatus for, the shaping of a signal or signals and the avoidance of interference using such signal or signals. The invention relates also to the use of such signal or signals in multi-antenna systems with antenna selection, and has particular application in the field of ultra wideband (UWB) communications.

Narrowband interference avoidance may be necessary in circumstances where both broadband and narrowband devices are operating in the same frequency range. FIG. 1 is an illustration of the overlap between narrowband and broadband signals in such circumstances.

It is known to avoid interference between a broadband device and a narrowband device by generating a spectral notch in the broadband signal by backing off of the power of the broadband signal at the frequency band of the licensed narrowband device. FIG. 2 is an illustration of narrowband interference avoidance, in which the power levels of the broadband signal in the overlap region with the narrowband signal have been reduced to avoid interference.

It is noted that the spectrum overlay, such as that shown in FIG. 1, causes mutual interference to both the broadband device and the narrowband licensed device. In the following, the operating frequency band or bands of such narrowband devices are referred to as interference bands. The broadband signal in the operating band of one or more narrowband devices may be suppressed so that the broadband system does not cause significant interference to those devices, and that may be referred to as interference avoidance.

The issue of avoidance of interference with licensed narrowband devices is particularly important for UWB systems. UWB systems occupy an unlicensed bandwidth of over 7 GHz which overlays with the spectrum of existing licensed narrowband devices. Transmission of UWB signals over the licensed frequency band causes interference to the existing licensed narrowband systems. To avoid the interference from UWB to such licensed devices, the maximum power of the transmitted UWB signals has been limited by the Federal Communications Committee (FCC) to an extremely low value of −41.3 dBm/MHz, which indicates that the power of the transmitted UWB signal cannot exceed this regulated value at any frequency.

In addition to power regulation requirements, it has also been proposed that when a UWB device detects or is otherwise aware that a narrowband licensed device is active in its operating frequency band, priority should be given to the licensed device, and the power of the transmitted UWB signals in such frequency bands should back off to an extent such that little or no energy is transmitted on those frequencies where the narrowband user's signal resides. The power back off for the purpose of interference avoidance can be achieved by generating spectral notches at those frequencies.

Spectral notching using active interference cancellation (AIC) has been proposed for orthogonal frequency division multiplexing (OFDM) transmissions in wideband systems, such as UWB systems, with single input and single output (SISO) antennas in order to avoid causing interference to narrowband signals (H. Yamaguchi, 34$^{th}$ European Microwave Conference, vol. 2, 1105-1108, 2004, and US 2006/008016). In that context, the term "interference" may refer to or include the additional signal energy (residual interference) from data subcarriers of the wideband signal when the wideband signal within the narrowband interference band is nulled. The term 'interference cancellation' may refer to the attempted suppression of any additional signal energy (the "interference") that resides in the desired notch position in the upsampled spectrum.

In such systems, an AIC algorithm is used to generate a spectral notch in the desired narrowband interference band by providing AIC tones including additional subcarriers, also referred to as AIC edge tones, at or beyond each edge of the interference band and substituting the data subcarriers at the corresponding frequency subcarriers by the designed AIC tones, thus avoiding causing interference to the 3$^{rd}$ party devices. Generally the AIC tones within the interference band are nulled. A schematic illustration of AIC tones for producing a frequency notch in an OFDM scheme is provided in FIG. 3. The AIC tones shown in FIG. 3 comprise nulled AIC tones 2 4 6 within the interference band and AIC edge tones 8 10 at or beyond the edge of the interference band. It is known to obtain the values of the AIC tones used to cancel out the residual interference from data subcarriers in the desired frequency positions in such systems either by performing a least square calculation (H. Yamaguchi, 34$^{th}$ European Microwave Conference, vol. 2, 1105-1108, 2004) or a regularized least square calculation (US 2006/008016).

FIG. 4 provides an example of the performance in terms of notch depth and the power at the edge AIC tones when AIC algorithms described in H. Yamaguchi, 34$^{th}$ European Microwave Conference, vol. 2, 1105-1108, 2004 and US 2006/008016 are used to create a spectral notch at the frequencies between subcarriers 85 to 87. It can be observed from FIG. 4 that there is around a 1-2 dB power excess relative to the data subcarriers for two subcarrier intervals (~8 MHz).

Therefore, the transmitted signals generated by the known AIC algorithms violate the UWB FCC mask where the power has been regulated to −41.3 dBm/MHz. For the power of AIC tones to meet the power regulation, the power of data subcarriers has to be backed off, which causes degradation in received signal strength and thus a degraded performance. Backing-off the power of the edge AIC tones to the power level of the data subcarriers results in a spectral notch that is not deep enough to meet the requirement for interference avoidance in a "detection and avoidance" (DAA) device, as shown in FIG. 5. The violation of power regulation prevents the utilization of known AIC algorithms in practical UWB devices.

Antenna selection may be used in orthogonal frequency divisional multiplexing (OFDM) systems on a per subcarrier basis in order to achieve robust links in UWB communications, where the antennas can be "selected" to be on or off based on a certain criteria. For example, in systems with two transmitter antennas when a channel gain criterion is applied, only one antenna will be active (on) and transmitting data on certain subcarriers when the channel gain experienced by this antenna at those subcarriers is higher than at the other antenna. The antenna will remain active (on) in respect of those subcarriers until the channel condition it experiences becomes worse than at the other antenna. At this point, this antenna will be switched off in respect of those subcarriers and the alternative antenna will be switched on. It should be noted that antenna selection on a per subcarrier basis does not necessarily imply that a particular antenna is not used at a given time. All antennas may well be used at any given time, using mutually exclusive subcarriers. So, purely by way of example, at a given time one antenna may be used to transmit all subcarriers below the k th subcarrier and the other antenna may be used to transmit the k th subcarrier and all subcarriers above the k th subcarrier, and the switching between antennas happens between the (k−1)th subcarrier and the k th subcarrier. In that example, k may be referred to as the antenna switching point. In practice, there may be multiple antenna switching points because the antennas will be switched on/off according to channel conditions. Here, one switching point, i.e., the k th subcarrier, is used as an example for illustration purposes.

In such OFDM or UWB systems with antenna selection, the antennas are switched on/off alternatively during signal transmission and the system sees two transmitter antennas as one by receiving a superposition of their respective OFDM symbols after separate transmission over the channel. The effective transmission power of the k th (k=1, 2, ... N ) subcarrier is the summation of the power of the k th subcarrier over all transmit antennas.

The problems with known AIC algorithms would be exacerbated if they were to be applied to systems with multiple antennas, in which the summation of the power of multiple AIC tones are required to stay below the power level of data subcarriers.

In particular, the fact that the known AIC algorithms bring spikes that exceed the power of data subcarrier at both edges of the AIC tones, means that direct use of the known AIC algorithms will bring excessive power violation at these tones, and are thus not applicable in practice to UWB devices with per subcarrier antenna selection.

In a first independent aspect, the present invention provides a method of shaping signals intended for transmission via at least one antenna, each signal having a respective frequency spectrum and being for transmission via a respective antenna, the method comprising selecting at least one interference-reducing signal, each interference-reducing signal being such as to modify the signal frequency spectrum for the antenna or a respective one of the antennas to include a respective frequency notch at an interference band, and modifying the frequency spectra with the selected at least one interference-reducing signal, wherein the selection is subject to a constraint on at least one characteristic of the spectra as modified.

By subjecting the selection to such a constraint or constraints, it may be ensured that the spectra as modified have a desired form. In particular, it may be ensured that the spectra are in compliance with regulatory or operational requirements.

There may be more than one interference band for each antenna and so a plurality of interference-reducing signals, for producing a plurality of notches, may be selected for each antenna.

Preferably, the constraint comprises ensuring that for at least one pre-determined frequency, the total power emission of the modified spectra at that frequency is at or below a pre-determined level.

Each signal intended for transmission may comprise a plurality of tones, also referred to as subcarriers. Each interference-reducing signal may also comprise a respective plurality of tones. Preferably each tone is located at a respective subcarrier frequency. The plurality of tones may be adjacent tones. The tones may be tones in accordance with a data communication protocol or method, such as OFDM. Each of at least some of the tones may be located at a respective frequency position used in such a data communication protocol or method. Such frequency positions may be frequency positions used to transmit a data bit or bits according to such a data communication protocol or method. Alternatively or additionally, at least some of the tones may be located at regularly spaced positions between such frequency positions. The selection of the or each interference-reducing signal may comprise selecting the AIC edge tones for that interference-reducing signal Preferably the tones at frequencies within the interference band are null tones.

The or each interference-reducing signal may comprise at least one AIC edge tone, and the at least one pre-determined frequency may be an edge tone frequency. Preferably the or each interference-reducing signal comprises a respective at least one edge tone at or beyond each side of an interference band. The or each interference-reducing signal may comprise a respective plurality of edge tones at or beyond each side of an interference band.

The selection of interference-reducing signals may be performed subject to the joint constraints of ensuring that for each edge tone frequency the total emission power of the powers of the spectra at that frequency (i.e., the sum of the powers of the spectrum over multiple antennas at that frequency) is below a pre-determined level.

Preferably the constraint comprises ensuring that the total emission power of the modified spectrum (for a single transmit antenna system) or the combined modified spectra (for a multiple transmit antenna system) at each AIC edge tone is equal to or less than a regulated power level. The regulated power level may be −41.3 dBm/MHz.

The method may be used to shape signals intended for transmission in a single input single output (SISO) system in which there is only one transmit antenna. In that case the spectra as modified is a single spectrum for the one transmit antenna. Preferably the method is used to shape signals intended for transmission in a multiple input multiple output (MIMO) system or multiple input single output (MISO) system. In that case the modified spectra may be considered to be the spectra summed across all of the multiple transmit antennas.

Preferably the signals are intended for transmission via a plurality of antennas, and the selection comprises jointly selecting each of the interference-reducing signals in a combined selection process.

By selecting the plurality of interference-reducing signals jointly, desired characteristics of the spectra, particularly when considered in combination, may be obtained. The power emitted by a system comprising a plurality of antennas generally depend on the superposition of the signals emitted by each antenna and thus it can be important to consider the combination of the power emitted by the antennas at the frequencies where the interference-reducing signal resides when selecting the interference-reducing signal. By selecting interference-reducing signals jointly rather than separately, desired characteristics of the combined frequency spectra may be obtained, the summation of the power of the edge AIC tones may be ensured to below the FCC mask, and interference effects between multiple antennas may more effectively be reduced.

Each frequency spectrum may be considered to comprise the variation of power as a function of frequency. The signal at each frequency in the spectrum has an amplitude and phase, and the power at a particular frequency is the square of the amplitude of the signal at that frequency.

Selection of each interference-reducing signal may comprise selecting the respective value of amplitude and/or phase of the interference-reducing signal as a function of frequency. The selection may comprise selecting the frequency range of each interference-reducing signal. Preferably the frequency range of each interference-reducing signal spans the or an interference band.

Preferably each of the interference-reducing signals is used to modify the signal frequency spectrum for a respective one of the antennas. Modifying the frequency spectra with the selected interference-reducing signals may comprise substituting each interference-reducing signal into a portion of the frequency positions of a respective signal intended for transmission in place of the original portion of the frequency positions.

Preferably, the spectra as modified is a combined spectrum comprising the superposition of each individual spectrum as modified. The signal at each frequency in such a combined spectrum as modified has an amplitude and phase resulting from the superposition of the signals in each individual modified spectrum at that frequency. The constraint preferably comprises a constraint on a characteristic of the combined spectrum. Alternatively the constraint may comprise a respective constraint on a characteristic of each individual modified spectrum.

The interference band may be a frequency or range of frequencies at which a narrowband device, in particular a licensed narrowband device, is known to operate. The interference-reducing signals may be signals that, if used in combination to modify the frequency spectra may, ultimately, minimise the interference from the radiation emitted by the antennas considered in combination to the narrowband radiation, if present.

The signals for transmission may be subject to at least one further process after modification and before transmission, including for instance one or more of digital-to-analogue conversion, upconversion and amplification. The constraint on at least one characteristic of the spectra as modified is preferably a constraint on the spectra as modified and after being subject to the at least one further process. Preferably the constraint is a constraint on the modified spectra of the transmitted signals. In that case, the constraint serves to constrain at least one characteristic of the propagating electromagnetic radiation resulting from transmission from at least one antenna.

The signals may be multicarrier modulation signals, and are preferably orthogonal frequency divisional multiplexing (OFDM) signals. The signals may be UWB signals.

The joint selection of the interference-reducing signals may be performed subject to the constraint of ensuring that for at least one pre-determined frequency, the sum of the powers of the modified spectra over multiple antennas at that frequency is at or below a pre-determined level.

Preferably the constraint comprises ensuring that for all frequencies within a pre-determined range the sum of the powers over multiple antennas of the modified spectra are below a pre-determined level.

The selection of interference-reducing signals may comprise minimising the or each notch. Preferably, minimisation of a notch comprises ensuring that the average power across the frequency range of the notch is as low as possible and/or is at or below a pre-determined level.

By minimising the or each notch, any interference effects at the interference band may be minimised. The joint constraint may comprise ensuring the emission power over multiple antennas at the frequencies of the edge AIC tones is below the FCC mask when combined.

The joint selection of the interference-reducing signals on any of the antennas may be omitted when the average power of the spectrum at the frequencies of the interference-reducing signals is equal to or lower than a pre-determined level.

The joint selection of the interference-reducing signals may be performed subject to the joint constraint of minimising peak to average power ratio.

For each antenna the respective signal may comprise at least one frequency band comprising data to be transmitted.

Preferably the frequency bands of the antennas are substantially contiguous. The frequency band for each antenna may comprises a tone or set of tones that represent data to be transmitted. Preferably, for each antenna, the tone or any of the set of tones in the frequency band for that antenna are not included in the frequency band for any other antenna.

The method may further comprise, for each antenna, varying the weight given to the efforts of minimising the spectral notch or notches in the frequency spectrum for that antenna in the selection of the interference-reducing signals in dependence upon whether the frequency band or bands of that antenna are outside the interference band.

The method may further comprise identifying a switching point representing a boundary between a frequency band of one antenna and the frequency band of another antenna, and the method further comprises determining whether the switching point occurs within or outside the range of frequencies of the frequency notch or interference band, and varying the weight given to minimising the spectral notch in the frequency spectrum of at least one of the antennas in the selection of the interference-reducing signals in dependence upon that determination.

Preferably the method further comprises giving substantially equal weight to minimising spectral notch in the frequency spectra of the one antenna and the other antenna in the selection of the interference-reducing signals if the switching point is within the range of frequencies of the frequency notch or interference band.

The method may further comprise giving different weight to the minimising of the spectral notch in the frequency spectrum of the one antenna than to the frequency spectrum of the other antenna in the selection of the interference-reducing signals if the switching point is outside the range of frequencies of the frequency notch or interference band.

The method may further comprise applying a regularisation factor to determine the relative weight to be given to the minimisation of the notch depth for one of the antennas compared to the relative weight to be given to the minimisation of the notch depth for the other of the antennas.

Preferably the method further comprises setting the value of the regularisation factor in dependence upon whether the switching point is within or outside the range of frequencies of the frequency notch or interference band.

The method may further comprise determining whether the power of the frequency spectrum of any of the antennas is below a predetermined power level at the interference band, and if the power of the spectrum for an antenna is below the predetermined power level at the interference band then omitting to select or generate an interference-reducing signal for that antenna. Thus, if the frequency spectrum for an antenna is below the predetermined power level at the interference band, the selection of interference-reducing signals maybe omitted and the frequency spectrum may be left unmodified.

The method may further comprise determining, for each signal, whether the power of the frequency spectrum at frequencies within the interference band is below a pre-determined level, and preferably the method further comprises omitting the selecting of the interference reducing signals such that no spectral notch is generated in the frequency spectrum of a signal if the power of the frequency spectrum for that signal at frequencies at or within the interference band is below the predetermined level.

The power to be determined is preferably the average power. Alternatively, the power may be the peak power.

The method may further comprise, if the power of the frequency spectrum for a signal at frequencies at or within the interference band is below the pre-determined level, not selecting an interference-reducing signal in respect of that signal and/or not including the frequency spectrum for that signal in the joint selection process.

The selecting of the at least one interference-reducing signal may comprise an optimisation procedure that comprises minimising the following functions:—

$$\|Pt_1+d_1\lambda^2$$

$$\|Pt_2+d_2\lambda^2$$

.

.

.

$$\|Pt_n+d_n\|^2$$

subject to the constraints that:—

$$|t_1(1)|^2+|t_2(1)|^2\ldots+|t_n(1)|^2 \leq \epsilon_1$$

$$|t_1(M)|^2+|t_2(M)|^2\ldots|t_n(M)|^2 \leq \epsilon_2$$

wherein:—P is a matrix having rows that are the $(zf_l-(z-1))$ to $(zf_r-(z-1))$ th rows of the matrix $F^z F^H$ and columns that are the $f_l$ to $f_r$ th columns of the matrix $F^z F^H$ ($f_l$ and $f_r$ being the left and right edge AIC tones); $F^H$ is the Hermitian transpose of F; F is a normalised Fourier transform matrix and $F^z$ is the z times upsampled Fourier matrix; vector $d_i$ is a vector representing each of the $(zf_l-(z-1))$ to $(zf_r-(z-1))$ th frequency positions from the z times upsampled spectrum of the $i^{th}$ antenna after nulling the AIC tones within the interference band where the narrowband signal resides; $t_n$ are length M vectors representing the AIC tones for the $n^{th}$ antenna, respectively, and $t_i(m)$ is defined as the mth element in vector $t_i$; and $\epsilon_1$ and $\epsilon_2$ are pre-determined limits.

The selecting of the at least one interference-reducing signal may comprise an optimisation procedure that comprises minimising a cost function, and preferably the cost function is:—

$$f(t) = \|Pt_1 + d_1\|^2 + \delta_1\|Pt_2 + d_2\|^2 + \ldots \delta_{n-1}\|Pt_n + d_n\|^2 +$$
$$\lambda_1(|t_1(1)|^2 + |t_2(1)|^2 + \ldots |t_n(1)|^2 - \varepsilon_1) +$$
$$\lambda_2(|t_1(M)|^2 + |t_2(M)|^2 + \ldots |t_n(M)|^2 - \varepsilon_2)$$

and preferably minimisation of the cost function comprises searching for suitable values of the parameters $\lambda_1$ and $\lambda_2$, where $\delta_1 \ldots \delta_{n-1}$ are regularisation factors, each of which determines the relative weight given to the effort of minimising the spectral notch in a respective frequency spectrum compared to the other frequency spectra.

The method may further comprise varying the value of δ in dependence on whether the switching point is within or outside the range of frequencies of the frequency notch or interference band.

The optimisation procedure may comprise an iterative search procedure.

In a further, independent aspect there is provided apparatus for shaping signals intended for transmission via at least one antenna, each signal having a respective frequency spectrum and being for transmission via a respective antenna, the apparatus comprising selection means for selecting at least one interference-reducing signal, the selection means being configured to select each interference-reducing signal to be such as to modify the signal frequency spectrum for the antenna or a respective one of the antennas to include a respective frequency notch at an interference band, and means for modifying the frequency spectra with the selected interference-reducing signals, wherein the selection means is configured to perform the selection subject to a constraint on at least one characteristic of the spectra as modified.

In another independent aspect there is provided a transmission system comprising means for operating in accordance with any aspect of a method as claimed or described herein.

There is also provided, in a further independent aspect, a computer program product storing computer executable instructions operable to cause a general purpose computer to become configured to perform a method as claimed or described herein.

In a further independent aspect there is provided a plurality of signals, generated according to a method as claimed or described herein. In further independent aspects there is provided a computer program product storing data representing the plurality of signals, and a receiver configured to receive and process together the plurality of signals.

In a further independent aspect there is provided an active interference cancellation (AIC) algorithm for systems with antenna selection performed on a per subcarrier basis. The algorithm may generate spectral notches at the transmitters in the desired frequency band to avoid causing interference to other existing licensed systems, and thus may be used with technologies such as ultra wideband (UWB) where "detect and avoid" (DAA) subsystems may be required. The algorithm may be an efficient algorithm that determines whether or not interference avoidance is required on a certain antenna by measuring or computing the average power spectrum density of the transmitted signal on that antenna and comparing it to a predetermined threshold.

In another independent aspect there is provided a method of jointly designing active interference cancellation (AIC) tones to generate spectral notches for orthogonal frequency division multiplexing (OFDM) signals transmitted from multiple antennas where antenna selection is employed on a per subcarrier basis.

The antenna switching point may lie in the middle of the interference band. Alternatively the antenna switching point may not lie in the interference band. The method may comprise jointly designing multiple active interference cancellation tones for spectral notch generation as well as for peak-to-average ratio (PAPR) reduction.

The invention may have particular application in any wireless communication device that uses OFDM (one antenna or multiple antennas), where interference avoidance is desired. Examples include UWB-equipped PDAs, cameras and laptops.

Any feature in one aspect of the invention may be applied to other aspects of the invention, in any appropriate combination. In particular, apparatus features may be applied to method features and vice versa.

Embodiments of the invention will now be described, by way of example only, with reference to the accompanying drawings in which.

Figure 13:
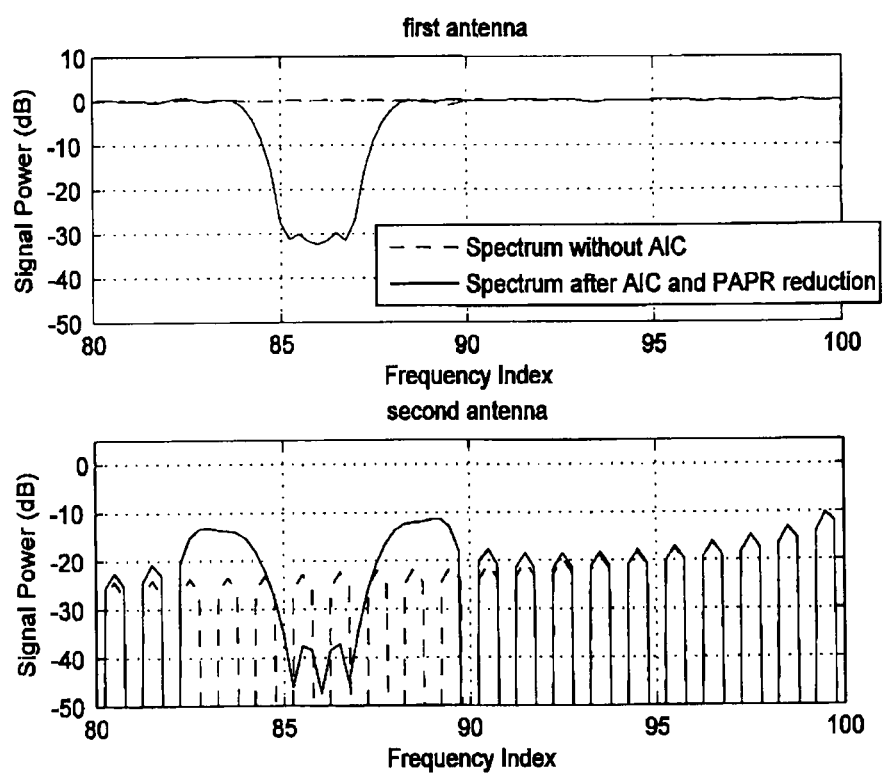
Figure 14:
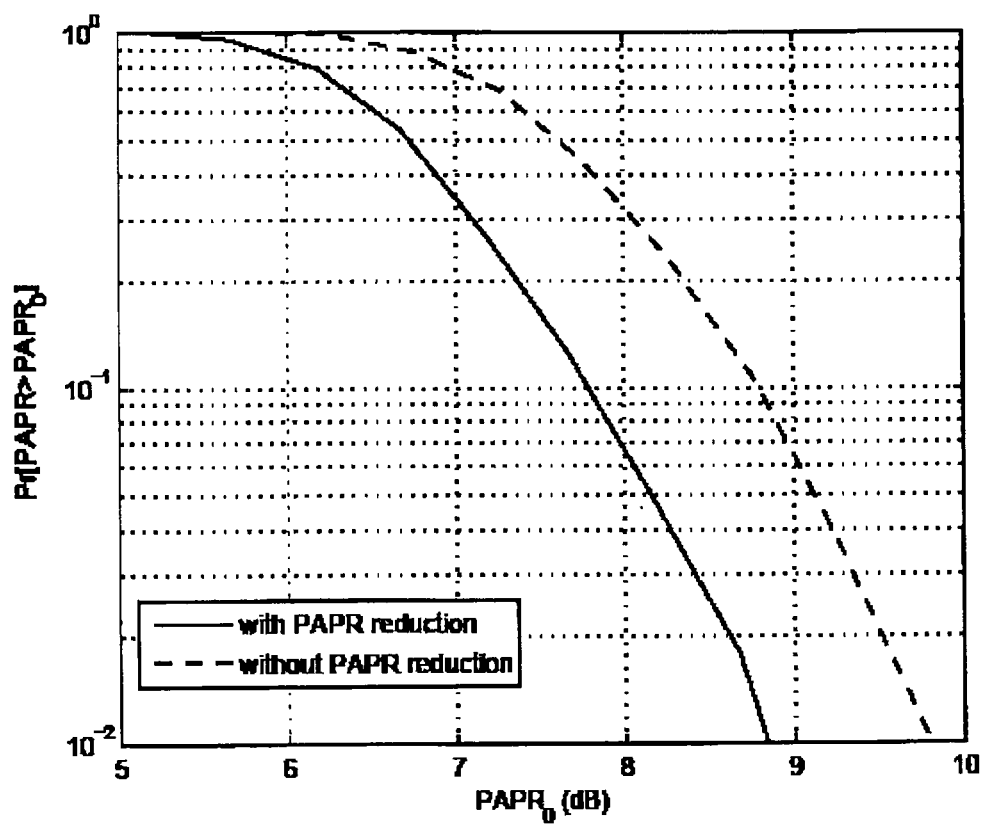

FIG. 13 is a graph showing examples of frequency spectra produced by the optimisation procedure of the further embodiment in which there is joint notch generation and PAPR reduction; and FIG. 14 is a graph showing an example of the variation of peak-to-average power reduction (PAPR) for an alternative method which provides joint notch generation and PAPR reduction and for a method which only provides notch generation (i.e., the constraints on the PAPR reduction are not considered).

Figure 6:
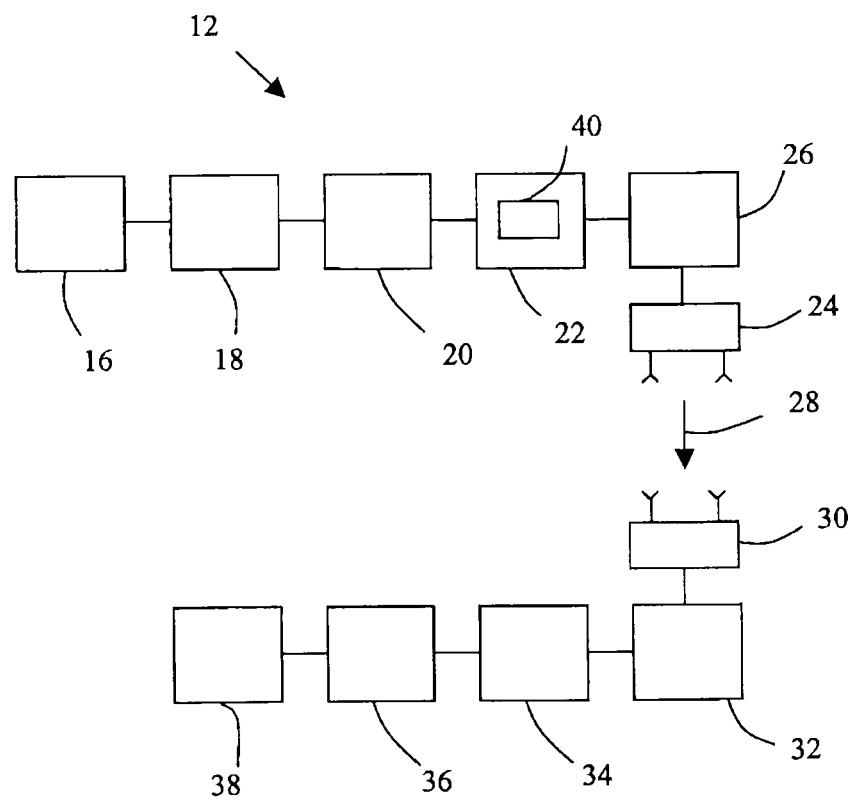
FIG. 6 is a schematic illustration of transmitter and receiver apparatus in accordance with the preferred embodiment.

An OFDM system with two transmit antennas that employs per subcarrier antenna selection is shown in FIG. 6. This figure shows a transmitter 12 and a receiver 14, both with multiple antennas, defining an OFDM channel therebetween. The transmitter 12 comprises a data source 16, which provides data (comprising information bits or symbols) to a channel encoder 18. The channel encoder 18 in this example comprises a convolutional coder such as a recursive systematic convolutional (RSC) encoder.

The channel encoder presents the encoded bits to a channel interleaver 20. The channel interleaver 20 interleaves the bits into symbols in a manner that ensures that errors do not arise due to repeated transmission of a bit in a certain position in a data frame from the same antenna, or that adjacent bits are separated so that errors due to breaks in transmission are possibly capable of being recovered.

The channel interleaver 20 passes the interleaved symbols to a mapper 22, that maps incoming symbols to a plurality of output tones, each for transmission from one or other antenna of a transmitter antenna array 24 comprising a plurality of transmit antennas. In this illustrated example, two transmit antennas are provided. In the general case, the number of transmit antennas is designated $T_x$.

The mapper 22 passes the output tones to the transmitter antenna array via space-time encoding and amplification circuitry 26 which performs an IFFT to convert the frequency tones to time varying signals, and upsamples and amplifies the signals in preparation for transmission by the transmitter antenna array 24.

The encoded transmitted signals propagate through a multiple input multiple output channel 28 defined between the transmit antenna array 24 and a corresponding receive antenna array 30 of the receiver 14. The receive antenna array 30 comprises a plurality $R_x$ of receive antennas which provide a plurality of inputs to a space-time (and/or frequency) decoder 32 of the receiver 16. In the embodiment of FIG. 6, the receive antenna array 30 comprises two receive antennas. In the general case, it is merely a condition of operability that $R_x \geq T_x$.

The receive antenna array 30 is connected to space-time decoder 32 that is operable to downconvert the received signals and convert the time varying signals into likelihood data representing encoded symbols. The receiver 14 of the specific embodiment is configured with the transmitter 12 in mind. The output of the space-time decoder 32 comprises a plurality of signal streams, one for each transmit antenna. The signal streams are provided to a channel de-interleaver 34 which reverses the effect of the channel interleaver 20 and outputs convolutional code on the basis of likelihood data provided by the space-time decoder 32.

The convolutional code output by the channel de-interleaver 34 is then presented to a channel decoder 36. In this example, the channel decoder 36 is a Viterbi decoder, which is operable to decode the convolutional code. The output of channel decoder 36 is provided to a data sink 38, for further processing of the data in any desired manner.

In operation, the mapper 22 maps incoming symbols to signals comprising a plurality of output tones, each for transmission from one or other antenna of the antenna array 24. The mapper 22 is operable to select the antenna to be used on a per subcarrier basis. In the present example the mapper 22 applies a channel gain criterion to determine which antenna is to be used for which subcarrier.

Figure 7:
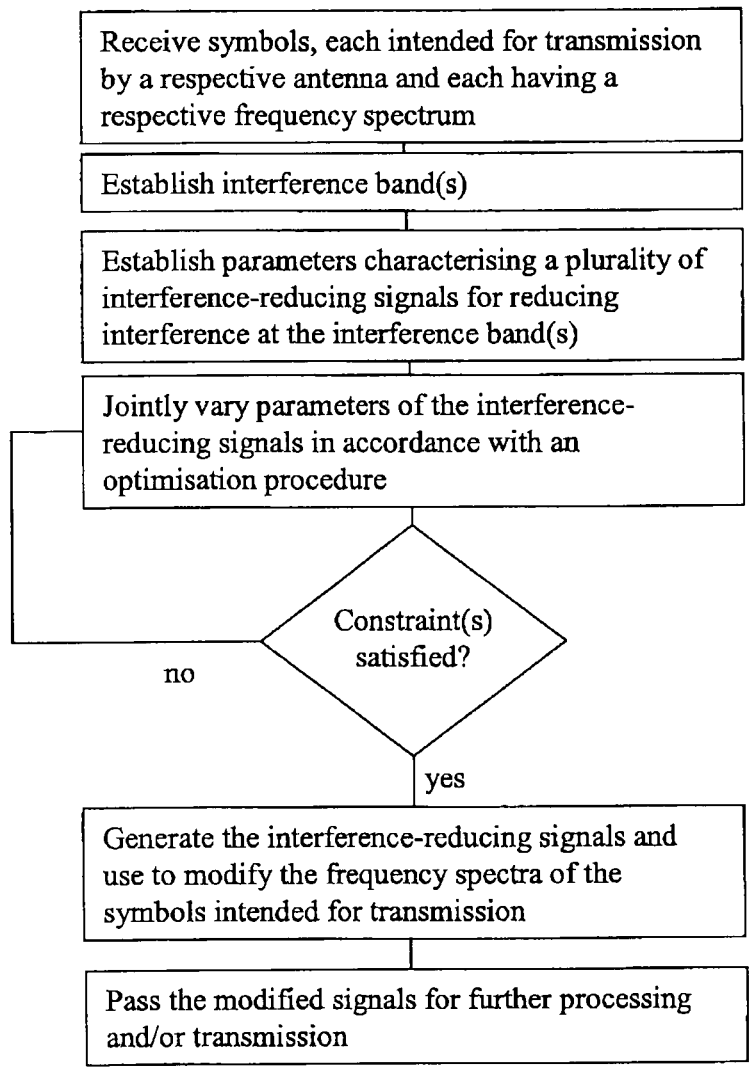
FIG. 7 is a flow chart that illustrates in overview certain steps of operation of the preferred embodiment.

The mapper 22 is operable to generate interference-reducing signals, and to modify each signal, in the form of a symbol, that is passed to it using a respective interference-reducing signal. The mapper 22 includes a processor 40 that is operable to select the interference-reducing signals using an optimisation procedure, that ensures that the selected interference-reducing signals are such that the spectra to be transmitted satisfy a pre-determined constraint or constraints. Operation of the mapper 22 and processor 40 is illustrated in overview in the flow chart of FIG. 7.

In the preferred mode of operation, the mapper 22 modifies the signals to include AIC tones so as to provide a frequency notch or notches in the output signals at the interference band or bands. The processor 40 applies the optimisation procedure in order to generate the appropriate AIC tones to provide frequency notches and desired AIC tone characteristics, as described in more detail below. The AIC tones are inserted by the mapper 22 into the signals to be transmitted via the antennas, in place of portions of those signals at and around the interference band. Typically, each AIC tone replaces a corresponding tone in a signal. Selection of the AIC tones comprises selecting the amplitude and/or phase of the tone. So, for instance a complex valued tone, having a value of say 1+i may be replaced by a selected AIC edge tone having a value of, say, 0.776+0.54i. In variants of the preferred embodiment the processor 40 is separate from but linked to the mapper 22.

The interference band or bands may be identified by operation of the transmitter or receiver antennas, which may be used to detect the presence of narrowband signals in the range of operation of the apparatus. The interference band or bands may, alternatively or additionally, be obtained by reference to a radio licensing authority, or other source, which maintains records of licensed narrowband transmissions. The location of the interference band or bands may be preprogrammed or otherwise stored in the processor 40.

To jointly generate notches in a desired frequency band on two antennas, each transmitter requires at least two subcarriers, one at each side of the interference band, as AIC tones to suppress the residual interference from the data subcarriers. More subcarriers can be used but only two are considered in the following example.

Figure 1:
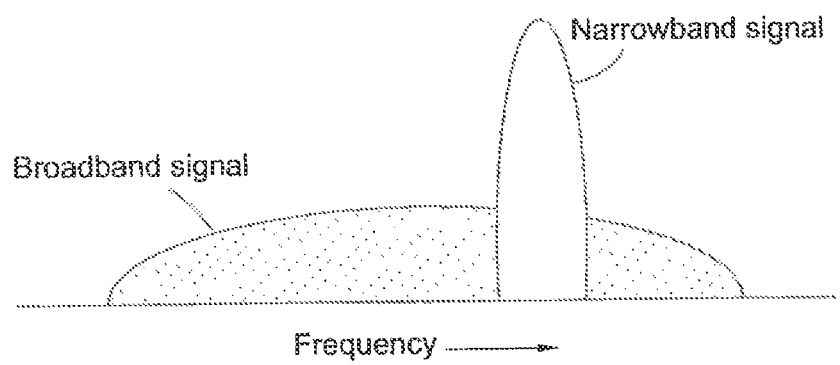
FIG. 1 is an illustration of narrowband and broadband signals occupying overlapping bandwidths.
Figure 2:
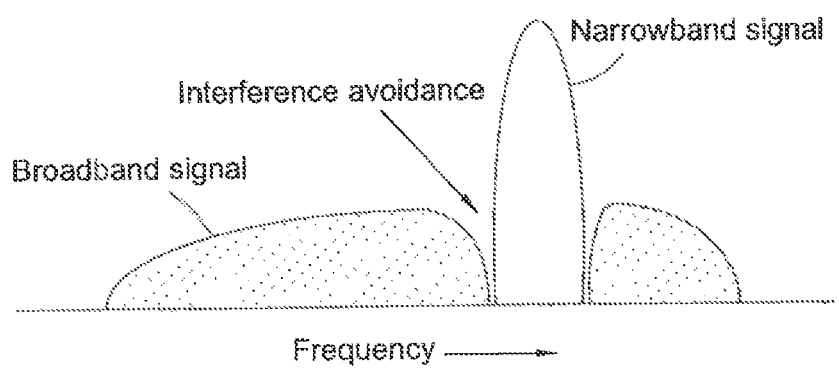
FIG. 2 is an illustration of interference avoidance, in which the power levels of a broadband signal are reduced in the operating frequency of a narrowband signal.
Figure 3:
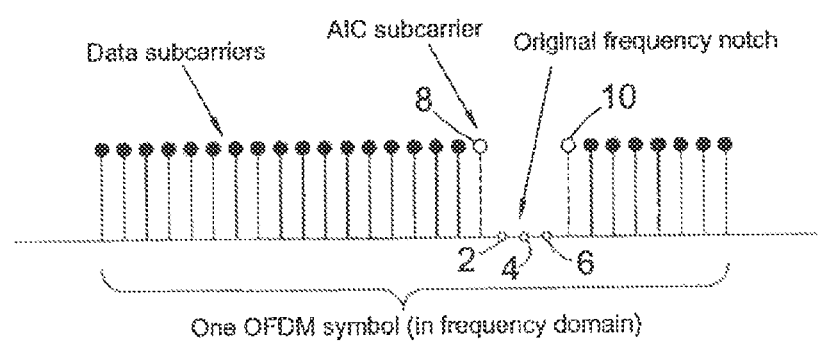
FIG. 3 is an illustration of a frequency notch and associated AIC subcarriers in an OFDM structure.
Figure 4:
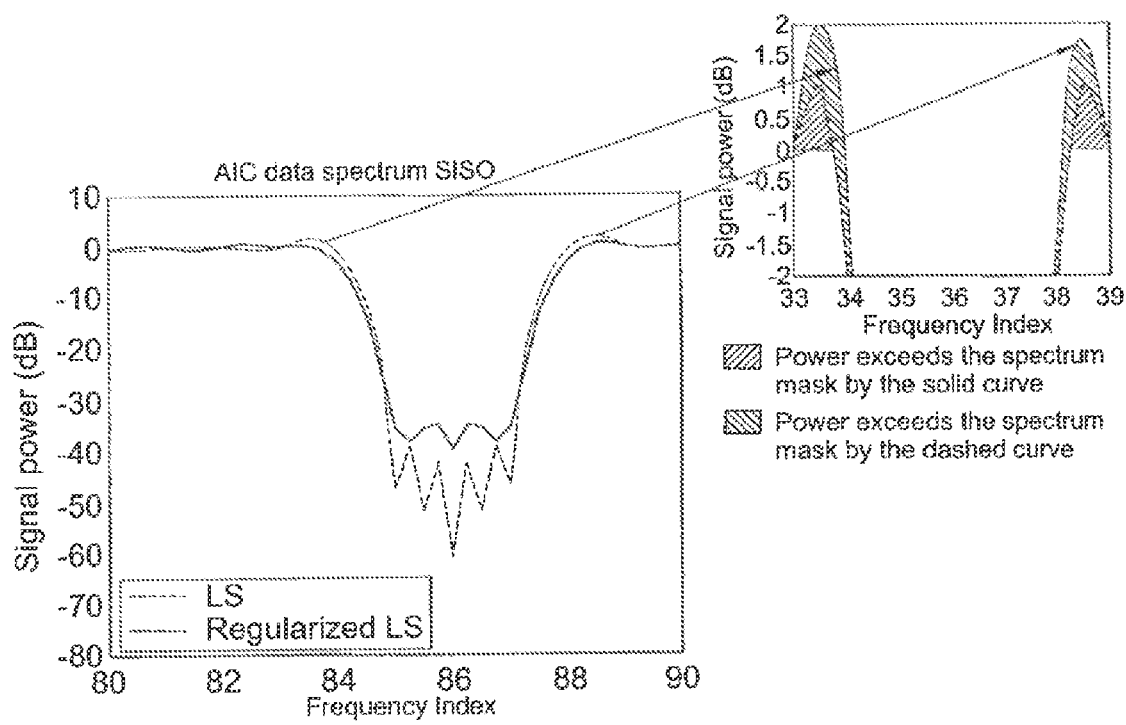
FIG. 4 is a graph of notch depth as a function of frequency for notches generated using known AIC algorithms, and includes an inset figure showing the peak power of the associated AIC edge tones.
Figure 5:
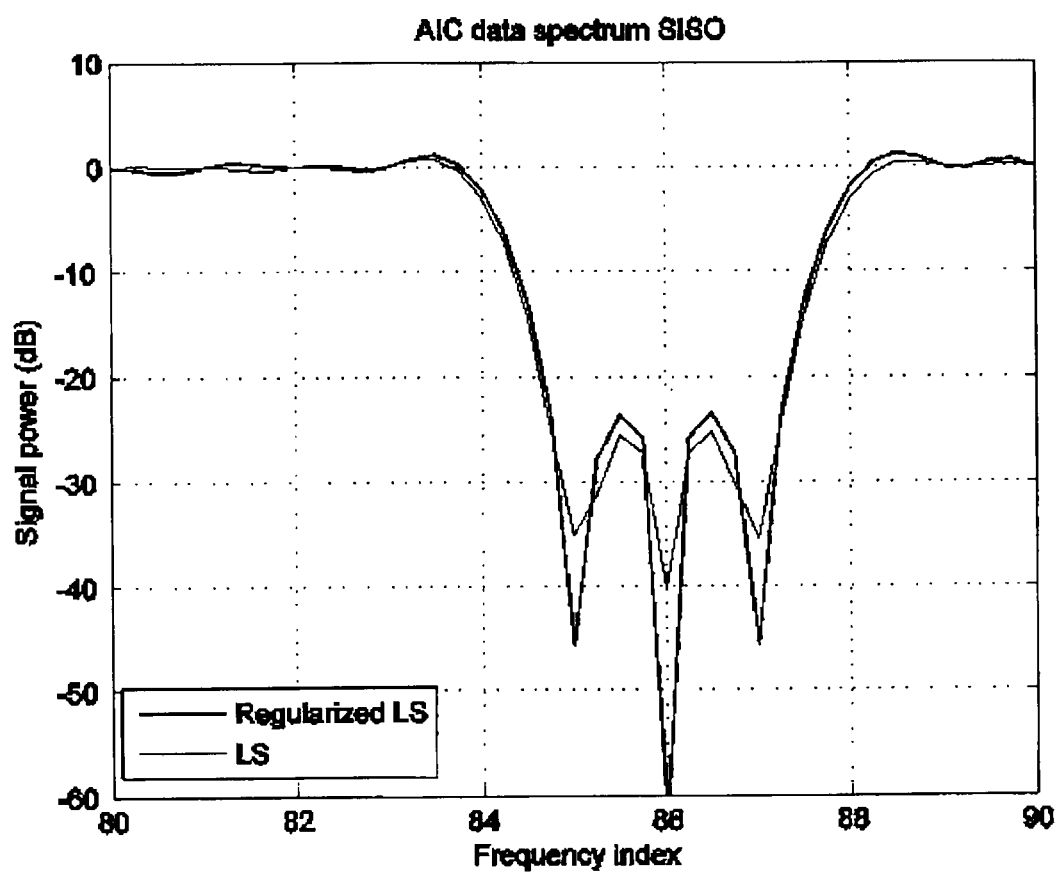
FIG. 5 is a graph of notch depth as a function of frequency for notches generated using known AIC algorithms with power back off at the edge AIC tones.

An example of operation of the apparatus of FIG. 1 is now considered in more detail. An OFDM symbol with N=128 subcarriers is to be transmitted. A spectral notch is to be generated at subcarriers 85 to 87, which span a narrowband interference region, using AIC tones at subcarriers 84 to 88. It should be noted that this example uses specific values for the number of subcarriers, and interference tone indices, but it will be understood that these are not exclusive, and the preferred embodiment may be used with a wide range of transmission characteristics. It should also be noted that the formulae used below relate to the two antenna situation and to a four-times upsampling ratio, but that in other embodiments any number of antennas and any suitable upsampling rate may be used and equations 1 to 4 may be generalised to the case of any arbitrary number, n, of antennas or upsampling ratio z.

Figure 8:
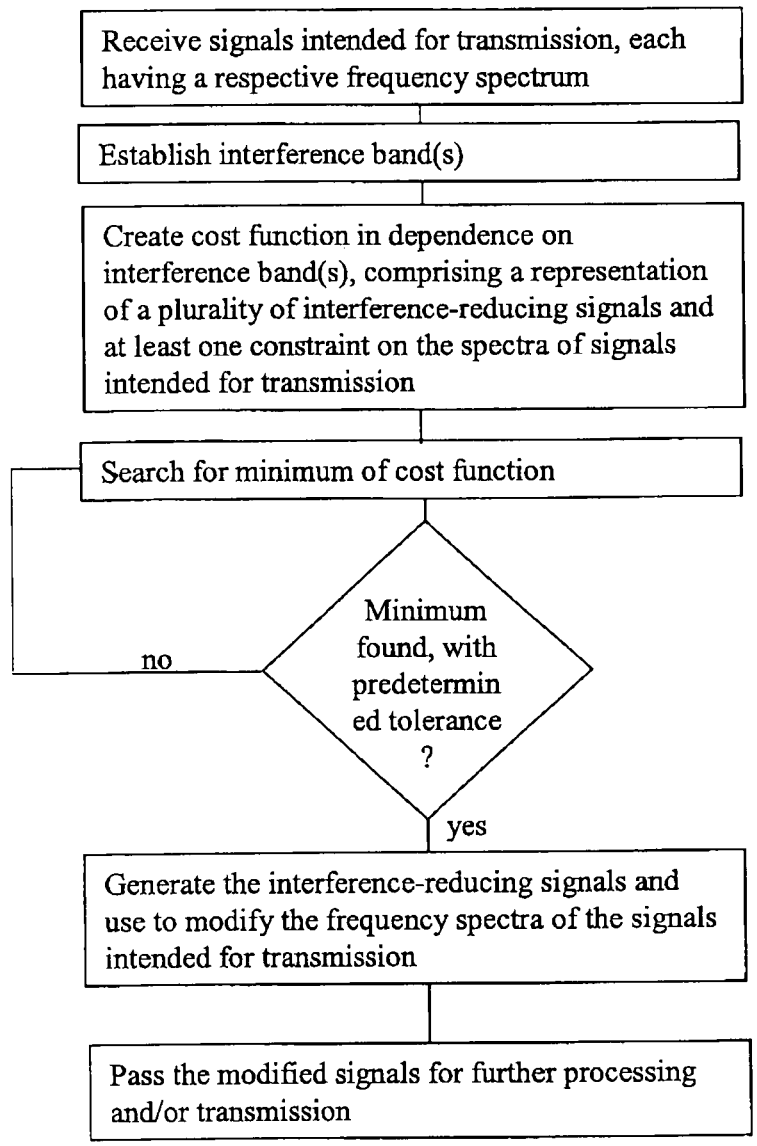
FIG. 8 is a flow chart that illustrates in more detail certain steps of operation of the preferred embodiment.

The following steps, illustrated in FIG. 8, are performed by the mapper 22 and associated processor 40:— a) On each antenna, null subcarriers $f_l$ to $f_r$ among the N=128 subcarriers to be transmitted, where $f_l$ and $f_r$ are the indices of the left and right edge of the AIC tones, respectively (e.g., $f_l$=84 and $f_r$=88). Denote the resulting vector as $q_i$ (i=1,2 denotes the $1^{st}$ and $2^{nd}$ antenna).

b) Obtain the 4 times upsampled spectrum of one OFDM symbol generated from $q_i$ by performing an IFFT (equivalent to left multiplying the vector $q_i$ by the matrix $F^H$, i.e., $F^H q_i$), and then 4 times upsampled FFT over $q_i$ (i.e., $F^4 F^H q_i$), where the matrix F is the normalised Fourier transform matrix and $F^4$ is the 4 times upsampled Fourier matrix (other upsampling factors can also be used).

Take the $(4f_l-3)$ to $(4f_r-3)$ th frequency position from the resulting 4 times upsampled spectrum and denote it as vector $d_i$.

c) Rather than following a least square or regularized least square formulation known from the prior art, the optimization problem addressed by the processor 40 is as follows:—

Minimize: $\|Pt_1+d_1\|^2$ (1)

$\|Pt_2+d_2\|^2$ (2)

Subject to: $|t_1(1)|^2+|t_2(1)|^2 \leq \epsilon_1$ (3)

$|t_1(M)|^2+|t_2(M)|^2 \leq \epsilon_2$ (4)

where the matrix P is defined as a $(4f_r-4f_l+1)$ by $(f_r-f_l+1)$ matrix, with its rows being the $(4f_l-3)$ to $(4f_r-3)$ th rows of $F^4 F^H$ and its columns being the $f_l$ to $f_r$ th columns of the matrix $F^4 F^H$, where $F^H$ is the Hermitian transpose of F. Furthermore, $t_1$ and $t_2$ are used to denote the AIC tones, which are length M vectors used to cancel out the residual interference in the interference band on the $1^{st}$ and $2^{nd}$ antenna, respectively, and $t_i(m)$ is defined as the mth element in vector $t_i$.

d) Solve (1) and (2) subject to (3) and (4), for $t_1$ and $t_2$.

e) Substitute subcarriers of $f_l$ to $f_r$ by $t_1$ and $t_2$ on the $1^{st}$ and $2^{nd}$ antennas, respectively, to obtain the OFDM symbols to be transmitted.

The optimisation procedure set out in steps c) and d) has the effect of jointly minimizing the notch depth on two antennas, and constraining the summation of the power at two edge AIC tones on both antennas to be smaller or equal to a pre-defined value. Therefore, if the pre-defined value is set to a suitable value, it can be ensured that the designed AIC tones would not cause any violation to the FCC power regulation.

In contrast, known AIC algorithms either only minimize the total power of the AIC vector (regularized least square algorithm) or do not consider the power constraints of edge AIC tones at all (least square algorithm approach), which causes excess power at the edge AIC tones of the generated spectrum, thus resulting in violations of the power regulation by FCC spectrum mask for UWB devices for around 2 subcarrier intervals (~8 MHz).

In one variant of the preferred embodiment, the optimisation procedure comprises establishing a cost function and searching for a minimum of the cost function, which has been found to be a particularly efficient approach. Operation of the mapper 22 and associated processor 40 in such a variant is illustrated in overview in the flow chart of FIG. 8.

The cost function is formed as:—

$$f(t) = \|Pt_1 + d_1\|^2 + \delta\|Pt_2 + d_2\|^2 + \lambda_1(|t_1(1)|^2 + |t_2(1)|^2 - \epsilon_1) + \lambda_2(|t_1(M)|^2 + |t_2(M)|^2 - \epsilon_2) \quad (5)$$

The solution is based on an iterative search for $\lambda_1$ and $\lambda_2$ over the interval [0,1], as illustrated in FIG. 8. For each value of $\lambda$'s, two edge AIC tones on each antenna can be calculated as $$t_i(1) = \frac{(\eta_1 \lambda_{(i,2)} + 1)\xi_{(i,1)} - \eta_2 \lambda_{(i,2)} \xi_{(i,2)}}{(1 + \eta_1 \lambda_{(i,1)})(1 + \eta_2 \lambda_{(i,2)}) - |\eta_2|^2 \lambda_{(i,1)} \lambda_{(i,2)}} \quad (6)$$

$$t_i(M) = \frac{(\eta_1 \lambda_{(i,2)} + 1)\xi_{(i,2)} - \eta_2^* \lambda_{(i,2)} \xi_{(i,1)}}{(1 + \eta_1 \lambda_{(i,1)})(1 + \eta_2 \lambda_{(i,2)}) - |\eta_2|^2 \lambda_{(i,1)} \lambda_{(i,2)}} \quad (7)$$

for i=1,2, where $\lambda_{(1,k)}=\lambda_k$, and $\lambda_{(2,k)}=\lambda_k/\delta$ (k=1,2), $\eta_1$ and $\eta_2$ are the two far end diagonal entries of matrix $W=(P^H P)^{-1}$, and $\xi_{(i,1)}$ and $\xi_{(i,2)}$ are the first and last element in vector $r_i = -(P^H P)^{-1} P^H d_i$, i=1,2 for the $1^{st}$ and $2^{nd}$ antennas, respectively.

The search process first calculates $|t_1(1)|^2+|t_2(1)|^2$ and $|t_1(M)|^2+|t_2(M)|^2$.

If the inequality constraints are met, and also if s, defined in equation 8, is smaller than a predetermined tolerance, in the form of a pre-defined minimum value, stop the searching process.

$$s = \|Pt_1+d_1\|^2 + \delta\|Pt_2+d_2\|^2 \quad (8)$$

Otherwise, keep searching until the inequality constraints are met and the minimum value of s is reached. Once the $\lambda$'s are obtained, form a column vector $\lambda_i = [\lambda_1 t_i(1), 0, 0, \ldots, 0, \lambda_2 t_i(M)]^T$, calculate $t_i(1)$ and $t_i(M)$, and obtain the AIC vectors on each antenna by:—

$$t_i = -(P^H P)^{-1} P^H d_i - (P^H P)^{-1} \lambda_i, \; i=1,2 \quad (9)$$

In the preferred embodiment, the optimisation procedure and searching process are carried out using a mathematical application package, such as MatLab or Mathematica. In variants of the preferred embodiment the optimisation procedure and searching process are carried out using dedicated programs or dedicated hardware.

The example above relates to two antennas and to a four-times upsampling rate, but in other examples more any number of antennas and any suitable upsampling rate may be used. The cost function of equation 5, and each of equations 6 to 9 may then be generalised for any number of antennas and any suitable upsampling rate.

Figure 9:
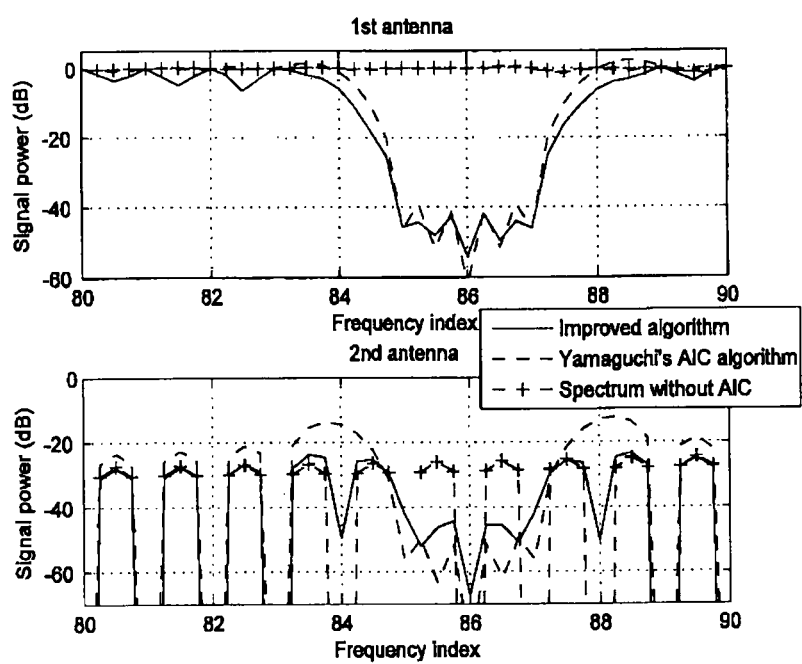
FIG. 9 is a graph showing examples of power of the spectra versus frequency for first and second antennas obtained using the method of the preferred embodiment and obtained using known methods.
Figure 10:
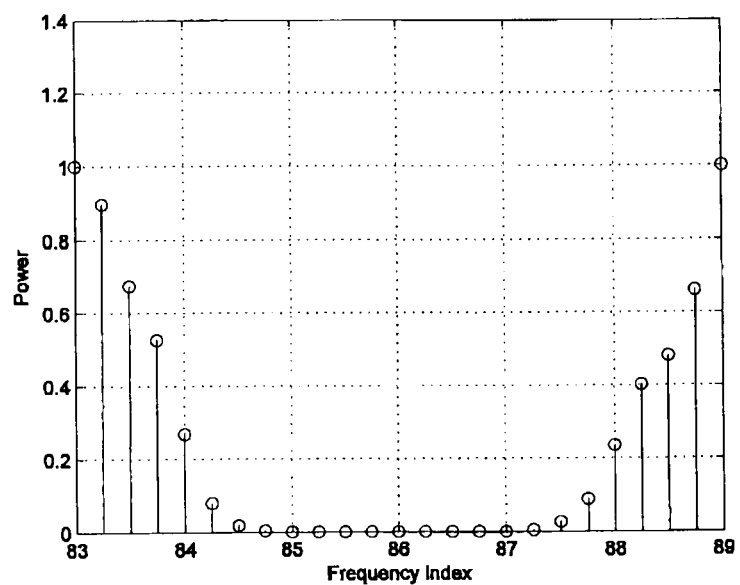
FIG. 10 is a graph of the sum of power of the designed interference-reducing signal for both first and second antennas versus frequency for subcarriers spanning the interference band.

The results of applying the optimisation procedure of the preferred embodiment, compared to the known AIC algorithm described in H. Yamaguchi, $34^{th}$ European Microwave Conference, vol. 2, 1105-1108, 2004 and US 2006/0008016 (referred to as Yamaguchi's algorithm), are illustrated in FIG. 9. Those figures show the spectrum power versus frequency for the first antenna and the second antenna achieved by the optimisation procedure of the preferred embodiment (referred to as the improved algorithm in the figure), and by Yamaguchi's algorithm, and compared to the spectrum power versus frequency if no AIC algorithm is applied. The summation of the power over two antennas from subcarriers 83 to 89 are also presented in FIG. 10.

It can be seen that the preferred embodiment provides suppression of the spikes generated at the edge AIC tones by maintaining the power of the edge AIC tones to a level that is equal to or less than the data subcarriers. Therefore, no violation of the FCC power regulation for UWB devices will occur, and the designed algorithm is practically applicable.

An additional factor $\delta$ is included in equation 5, in the preferred embodiment. The factor $\delta$ is a regularisation factor that enables the weight given to the minimisation of the notch depth for the first antenna relative to the weight given to the minimisation of the notch depth for the second antenna to be set.

The value of $\delta$ is set in dependence on whether an antenna switching point is present within a desired notch or whether the antenna switching point is before/after the desired notch.

A switching point is the frequency at which data transmission switches from one antenna to another antenna. Two cases are considered. In the first case, the switching point within the interference band or associated notch. In the second case, the switching point lies before (or after) the interference band or associated notch.

As mentioned above, the regularization factor $\delta$ determines how much weight one would like to put on the efforts of minimizing the notch on a certain antenna. When the antenna switching point lies within the interference band or notch, $\delta$ should be assigned to a value close to 1, i.e., the two notches on two antennas should be minimized at about the same level.

On the other hand, when the antenna switching point is before/after the interference band, so that one antenna or more antennas is switched off at a lower (or higher) frequency than the lower edge (or upper edge) of the interference band, the spectrum power will already degraded to a certain low value, and the regularization factor $\delta$ should be assigned to a small value, such as $10^{-4}$ or $10^{-3}$ if the antenna is switched off at the interference band.

By varying the value of $\delta$ as described above, it can be ensured that, as well as the power at the edge AIC tones meeting the FCC spectrum, there is less interference from the subcarriers on the antenna that has been switched off to the same subcarriers on the antenna that has been switched on, in the case where the switching point is before or after the notch or interference band.

Figure 11:
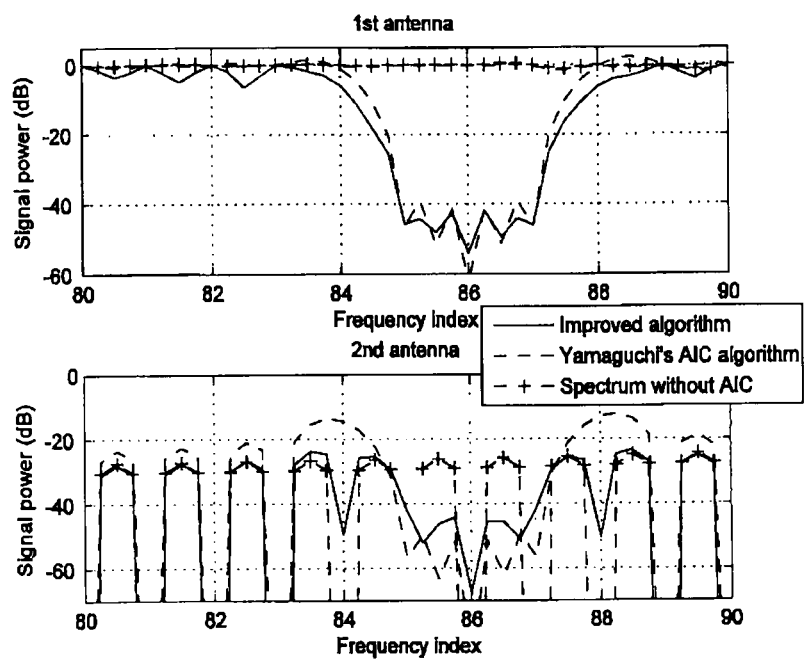
FIG. 11 is a graph showing examples of power of the spectra versus frequency for first and second antennas obtained using the method of a variant of the preferred embodiment and obtained using known methods, in the case where a switching point is located before or after the notch position or interference band.
Figure 12:
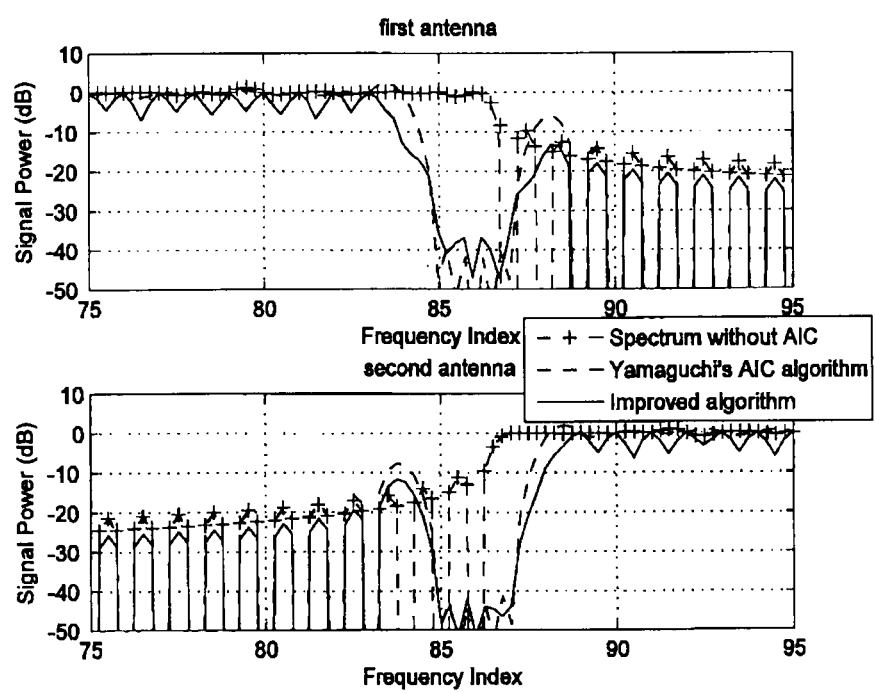
FIG. 12 is a graph showing examples of power of the spectra versus frequency for first and second antennas obtained using the method of a variant of the preferred embodiment and obtained using known methods, in the case where a switching point is located at the notch position or interference band.

The results of applying the optimisation procedure of the variant of the preferred embodiment in which the value of $\delta$ is set in dependence on whether an antenna switching point is present within a desired notch or whether the antenna switching point is before/after the desired notch, compared to the known AIC algorithm described in H. Yamaguchi, $34^{th}$ European Microwave Conference, vol. 2, 1105-1108, 2004 and US 2006/0008016 (referred to as Yamaguchi's algorithm), are illustrated in FIGS. 11 and 12. Those figures show the power spectrum versus frequency for the first antenna and the second antenna achieved by the optimisation procedure of the variant of the preferred embodiment (referred to as the improved algorithm in the figure), and by Yamaguchi's algorithm, and compared to the power spectrum versus frequency if no AIC algorithm is applied for the case where the switching point is before or after the notch position (FIG. 11) or at the notch position (FIG. 12).

It can be seen that using the algorithm of the variant of the preferred embodiment lower residual power (comparable to the original residual power without AIC) is generated at the adjacent subcarriers on the antenna that has been switched off, since lower power has been assigned to the edge AIC tones. This enables less additional interference from the subcarriers that are not transmitted on from one antenna to the subcarriers that are transmitted on from the other antenna at the receiver end when frequency offset is present.

It is noted that where the switching point lies outside of the interference band, it is possible that the power emitted at the interference band by the antenna that is switched off has already degraded to a lower enough level (for instance, −30 dB) and the operation of the AIC algorithm with respect to that antenna may not be necessary. In further variants of the preferred embodiment, it is determined whether the average power spectrum density at the interference band has reached a low enough level, for example below −30 dB, for the antenna that has been switched off for a while. If the average power spectrum density has reached a low enough level then it is not necessary to generate an interference-reducing signal for that antenna.

Considering such variants in more detail, and denoting the set of AIC tones as A, the interference avoidance subsystem can be switched off when $$\max_{l,j} \overline{P}_{l \in A, i} < T \qquad (10)$$

where $\overline{P}_{i \in A, j}$ is the average power at frequency $$l\Delta f + \frac{i}{m}\Delta f,$$

with l being an integer and l $\in$A, m being the upsampling factor, i being an integer with i=1, 2, . . . m, $\Delta f$ being the subcarrier spacing in an OFDM system, and T being a threshold value (as an example, T=7.4×10$^{-5}$ µW/MHz, i.e., −30 dB below the transmission power of the data subcarrier).

The average power at frequency $$l\Delta f + \frac{i}{m}\Delta f$$

can be measured at the transmitter, or it can be pre-computed as $$\overline{P}_{l \in A, i} = \frac{1}{N^2} \left| P\left(l\Delta f + \frac{i}{m}\Delta f\right) \right|^2 \sum_{k \notin A \sim \tau} \left| \sum_{n=0}^{N-1} e^{j\frac{2\pi}{N}n\left(k-l-\frac{i}{m}\right)} \right|^2 \quad (11)$$

where P(f) is the Fourier Transform of the pulse shaping filter p(t), and τ is the set containing subcarriers that are used for transmission, i.e., on antennas that are not switched off.

In other embodiments, antenna switching points are not considered at all and equal weight is given to the minimisation of the notch depth for each or all antennas regardless of the position of any antenna switching points, and the factor δ is not used (or equivalently, is set to be equal to one in all circumstances).

In further embodiments, additional constraints are used, and the peak-to-average power ratio (PAPR) at each transmitter as well as the depth of spectral notches, by using multiple AIC tones at each end of the interference band.

The problem for joint notch generation and PAPR reduction in such embodiments is formulated as follows.

Minimize (12)
i) $\|Pt_1 + d_1\|^2$ ii) $\|Pt_2 + d_2\|^2$ (13)

iii) $u$ (14)

Subject to:

i) $|t_1(1)|^2 + |t_2(1)|^2 \le \varepsilon_1$ (15)

ii) $|t_1(M)|^2 + |t_2(M)|^2 \le \varepsilon_2$ (16)

iii) $|x_{1,i}|^2 \le u$ for $i = 0, 1, \ldots N-1$ (17)

iv) $|x_{2,i}|^2 \le u$ for $i = 0, 1, \ldots N-1$ (18)

where $x_{1,i}$ and $x_{2,i}$ are the time domain transmitted signals on the $1^{st}$ and $2^{nd}$ antennas after AIC. The cost function can therefore be formulated as:—

$$f(h) = \quad (19)$$
$$\|Pt_1 + d_1\|^2 + \delta_1 \|Pt_2 + d_2\|^2 + \delta_2 u + \lambda_1 (|t_1(1)|^2 + |t_2(1)|^2 - \varepsilon_1) +$$
$$\lambda_2 (|t_1(M)|^2 + |t_2(M)|^2 - \varepsilon_2) + \lambda_3 (|x_{1,i}|^2 - u) + \lambda_4 (|x_{2,i}|^2 - u)$$

where $\delta_1$ and $\delta_2$ are the regularization factors and $\lambda_1, \lambda_2, \lambda_3$ and $\lambda_4$ are Lagrange multipliers. Two AIC tones at each side of the interference band are used and the vectors $t_1$ and $t_2$ are obtained numerically using techniques such as those described above.

The example above relates to the case of two antennas and to a four-times upsampling ratio, but that in other embodiments any number of antennas and any suitable upsampling rate may be used and equations 12 to 19 may be generalised to the case of any arbitrary number, n, of antennas or upsampling ratio z.

FIG. 13 shows examples of frequency spectra produced by the optimisation procedure of the further embodiment in which there is joint notch generation and PAPR reduction. Those figures show the power spectrum versus frequency for the first antenna (FIG. 13a) and the second antenna (FIG. 13b) achieved by the optimisation procedure of the further embodiment compared to the power spectrum versus frequency if no AIC algorithm is applied.

FIG. 14 shows the PAPR achieved by the further embodiment (dashed line) in which there is joint notch generation and PAPR reduction compared to the PAPR achieved in the case where no additional constraints on the PAPR, such as those set out in equations 17 and 18, are applied. It can be seen that the further embodiment has reduced the PAPR by about 1 dB.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A method of shaping signals intended for transmission via a plurality of antennas in a multi-carrier communications system, each signal having a respective frequency spectrum and being for transmission via a respective antenna, each said respective frequency spectrum comprising a plurality of subcarriers, the method comprising:
defining, for each antenna, a plurality of possible interference-reducing signals, each interference-reducing signal having a respective plurality of tones, being such as to modify the plurality of subcarriers for the respective antenna, such that respective frequency notch is generated at an interference band in the frequency spectrum of the signals transmitted via the respective antenna, wherein each of said interference-reducing signals comprises at least one AIC edge tone,
selecting, for each antenna, a respective interference-reducing signal, the selected signals together defining a group of interference-reducing signals;
modifying the frequency spectrum of each antenna with its respective interference-reducing signal;
wherein selection of the interference-reducing signal for each antenna is carried out jointly and comprises:
minimising a cost function in order to find a group of interference-reducing signals that will together minimize the frequency notch for each antenna, subject to the constraint that the total power emission for the modified spectra at a predetermined frequency remains at or below a pre-determined level.

2. A method according to claim 1, wherein the pre-determined frequency is an edge tone frequency.

3. A method according to claim 1, wherein the selection of the interference-reducing signals is performed subject to the constraint of minimising peak to average power ratio.

4. A method according to claim 3, wherein the constraint comprises ensuring that the power from each subcarrier in each modified spectrum is at or below a predetermined limit.

5. A method according to claim 1, wherein for each antenna the respective signal comprises at least one frequency band comprising data to be transmitted.

6. A method according to claim 5, wherein the method further comprises, for each antenna, varying the weight given to minimising the notch or notches in the frequency spectrum for that antenna in the selection of the interference-reducing signals in dependence upon whether the frequency band or bands of that antenna are outside the interference band.

7. A method according to claim 5, further comprising identifying a switching point representing a boundary between a frequency band of one antenna and the frequency band of another antenna, and the method further comprises determining whether the switching point occurs within or outside the range of frequencies of the frequency notch or interference band, and varying the weight given to minimising a notch in the frequency spectrum of at least one of the antennas in the selection of the interference-reducing signals in dependence upon that determination.

8. A method according to claim 1, further comprising determining, for each signal, whether the power of the frequency spectrum at frequencies at or within the interference band is below a pre-determined level, and omitting the selecting of an interference reducing signal or signals such that no spectral notch is generated in the frequency spectrum of a signal, if the power of the frequency spectrum for that signal at frequencies at or within the interference band is below the pre-determined level.

9. A method according to claim 8, further comprising, if the power of the frequency spectrum for a signal at frequencies at or within the interference band is below the pre-determined level, not selecting an interference-reducing signal in respect of that signal and/or not including the frequency spectrum for that signal in the selection process.

10. A method according to claim 1, wherein the selecting of the at least one interference-reducing signal comprises an optimisation procedure that comprises minimising the following functions:—

$$\|Pt_1+d_1\|^2$$

$$\|Pt_2+d_2\|^2$$

.

.

.

$$\|Pt_n+d_n\|^2$$

subject to the constraints that:—

$$|t_1(1)|^2+|t_2(1)|^2\ldots+|t_n(1)|^2 \leq \epsilon_1$$

$$|t_1(M)|^2+|t_2(M)|^2\ldots|t_n(M)|^2 \leq \epsilon_2$$

wherein:—P is a matrix having rows that are the $(zf_l-(z-1))$ to $(zf_r-(z-1))$th rows of the matrix $F^z F^H$ and columns that are the $f_l$ to $f_r$ th columns of the matrix $F^z F^H$; $F^H$ is the Hermitian transpose of F; F is a normalised Fourier transform matrix and $F^z$ is the z times upsampled Fourier matrix; vector $d_i$ is a vector representing each of the $(zf_l-(z-1))$ to $(zf_r-(z-1))$ th frequency positions from the z times upsampled spectrum of the $i^{th}$ antenna; $t_n$ are length M vectors representing the AIC tones for the $n^{th}$ antenna, respectively, and $t_i(m)$ is defined as the mth element in vector $t_i$; and $\epsilon_1$ and $\epsilon_2$ are pre-determined limits.

11. A method according to claim 1, wherein the cost function is:—

$$f(t) = \|Pt_1 + d_1\|^2 + \delta_1\|Pt_2 + d_2\|^2 + \ldots \delta_{n-1}\|Pt_n + d_n\|^2 +$$
$$\lambda_1(|t_1(1)|^2 + |t_2(1)|^2 + \ldots |t_n(1)|^2 - \varepsilon_1) +$$
$$\lambda_2(|t_1(M)|^2 + |t_2(M)|^2 + \ldots |t_n(M)|^2 - \varepsilon_2)$$

and minimisation of the cost function comprises searching for suitable values of the parameters $\lambda_1$ and $\lambda_2$, where $\delta$ is a regularisation factor that determines the relative weight given to the frequency spectrum of one of the antennas compared to the other antennas.

12. A method according to claim 11, further comprising varying the value of $\delta$ in dependence on whether a switching point representing a boundry between a frequency band for one antenna and the frequency band for another antenna is within or outside the range of frequencies of the frequency notch or interference band.

13. Apparatus for shaping signals intended for transmission via a plurality of antennas in a multi-carrier communications system, each signal having a respective frequency spectrum and being for transmission via a respective antenna, each said respective frequency spectrum comprising a plurality of subcarriers, the apparatus comprising:
    selection means for selecting, for each antenna an interference-reducing signal having a respective plurality of tones being such as to modify the plurality of subcarriers for the respective antenna such that a respective frequency notch is generated at an interference band in the frequency spectrum of the signals transmitted via the respective antenna, wherein said interference-reducing signal comprises at least one AIC edge tone; and
    means for modifying the frequency spectra with the selected interference-reducing signals;
    wherein the selection means is configured to jointly carry out selection of the interference-reducing signal for each antenna by minimising a cost function in order to find the interference-reducing signals that will together minimise the frequency notch for each antenna, the minimization procedure being carried out subject to the constraint that the total power emission for the modified spectra at a predetermined frequency is at or below a pre-determined level.

14. A non-transitory computer readable medium storing program instructions which when executed by a processor results in performance of the method as recited in any one of claims 1-12.

* * * * *